(12) United States Patent
Hoechli et al.

(10) Patent No.: US 12,099,242 B2
(45) Date of Patent: Sep. 24, 2024

(54) CONNECTOR DEVICE, CONNECTOR AND CONNECTION CABLE

(71) Applicant: ODU GmbH & Co. KG, Muehldorf a. Inn (DE)

(72) Inventors: Remo Hoechli, Dürnten (CH); Georg Wittmann, Toeging (DE); Rudolf Weidenspointner, Mehring (DE)

(73) Assignee: ODU GMBH & CO. KG, Mühldorf (DE)

( * ) Notice: Subject to any disclaimer, the term of this patent is extended or adjusted under 35 U.S.C. 154(b) by 41 days.

(21) Appl. No.: 17/737,702

(22) Filed: May 5, 2022

(65) Prior Publication Data

US 2022/0357521 A1    Nov. 10, 2022

(30) Foreign Application Priority Data

May 6, 2021    (DE) ..................... 10 2021 111 848.4

(51) Int. Cl.
*G02B 6/38*    (2006.01)

(52) U.S. Cl.
CPC ................... *G02B 6/3825* (2013.01)

(58) Field of Classification Search
CPC ....................................................... G02B 6/38
USPC ......................................................... 385/56
See application file for complete search history.

(56) References Cited

U.S. PATENT DOCUMENTS

| | | | | |
|---|---|---|---|---|
| 5,121,454 A | * | 6/1992 | Iwano .................. | G02B 6/3849 385/59 |
| 5,323,480 A | * | 6/1994 | Mullaney ............. | G02B 6/4455 385/134 |
| 5,446,823 A | * | 8/1995 | Bingham .............. | G02B 6/501 385/136 |
| 5,455,391 A | * | 10/1995 | Demesmaeker ..... | H02G 15/013 174/92 |
| 5,528,711 A | * | 6/1996 | Iwano .................. | G02B 6/3879 385/59 |
| 5,537,501 A | * | 7/1996 | Iwano .................. | G02B 6/3817 385/59 |
| 5,673,346 A | * | 9/1997 | Iwano .................. | G02B 6/3869 385/60 |
| 6,736,547 B2 | * | 5/2004 | Stevens ................ | G02B 6/3846 385/61 |
| 6,848,834 B1 | * | 2/2005 | Roehrs ................. | G02B 6/3894 385/59 |
| 7,137,742 B2 | * | 11/2006 | Theuerkorn ......... | G02B 6/3847 385/53 |

(Continued)

FOREIGN PATENT DOCUMENTS

| | | |
|---|---|---|
| CN | 110308525 A | 10/2019 |
| EP | 0964277 A1 | 12/1999 |

(Continued)

*Primary Examiner* — Kaveh C Kianni (74) *Attorney, Agent, or Firm* — Harris Beach PLLC; Laura W. Smalley (57) ABSTRACT

A connector system has a first connector device including a first universal module and a first configuration module, and has a second connector device including a second universal module identical to the first universal module and a second configuration module. The universal modules each include an optical contact and the configuration modules each define a connector gender, and the first connector device and the second connector device are suitable for entering into a common plug connection when assembled.

22 Claims, 8 Drawing Sheets

(56) References Cited

U.S. PATENT DOCUMENTS

| | | | | |
|---|---|---|---|---|
| 7,207,727 B2* | 4/2007 | Tran | G02B 6/389 | |
| | | | 385/83 | |
| 7,780,173 B2* | 8/2010 | Mullaney | G02B 6/4442 | |
| | | | 277/621 | |
| 8,989,550 B2* | 3/2015 | Allen | G02B 6/4454 | |
| | | | 385/135 | |
| RE45,951 E* | 3/2016 | Mullaney | G02B 6/4471 | |
| 9,291,790 B2* | 3/2016 | Kimbrell | G02B 6/4471 | |
| 9,304,262 B2* | 4/2016 | Lu | G02B 6/3885 | |
| 9,310,578 B2* | 4/2016 | Vastmans | G02B 6/4292 | |
| 9,348,096 B2* | 5/2016 | Kmit | G02B 6/4285 | |
| 9,513,451 B2* | 12/2016 | Corbille | G02B 6/4494 | |
| 10,545,299 B2* | 1/2020 | Takeuchi | H01R 13/6683 | |
| 10,605,998 B2* | 3/2020 | Rosson | G02B 6/3825 | |
| 10,782,474 B2* | 9/2020 | Brusberg | G02B 6/136 | |
| 10,976,513 B2* | 4/2021 | Allen | G02B 6/443 | |
| 11,262,520 B2* | 3/2022 | Geens | G02B 6/4444 | |
| 2008/0232743 A1* | 9/2008 | Gronvall | G02B 6/3897 | |
| | | | 385/77 | |
| 2012/0008909 A1* | 1/2012 | Mertesdorf | G02B 6/3897 | |
| | | | 385/135 | |
| 2014/0226935 A1* | 8/2014 | Allen | G02B 6/4444 | |
| | | | 385/59 | |
| 2016/0041356 A1* | 2/2016 | Wang | G02B 6/3821 | |
| | | | 385/56 | |
| 2016/0154184 A1* | 6/2016 | Bund | G02B 6/3821 | |
| | | | 29/428 | |
| 2016/0202441 A1* | 7/2016 | Claessens | G02B 6/4477 | |
| | | | 385/113 | |
| 2016/0204592 A1* | 7/2016 | Coenegracht | H02G 15/04 | |
| | | | 277/606 | |
| 2017/0003459 A1* | 1/2017 | Takeuchi | G02B 6/3895 | |
| 2018/0136410 A1* | 5/2018 | Takeuchi | G02B 6/385 | |
| 2019/0310428 A1* | 10/2019 | Takeuchi | G02B 6/385 | |
| 2020/0326488 A1* | 10/2020 | Patenaude | G02B 6/3817 | |
| 2021/0141185 A1* | 5/2021 | Geens | G02B 6/3891 | |
| 2022/0260791 A1* | 8/2022 | Ninomiya | G02B 6/421 | |

FOREIGN PATENT DOCUMENTS

| | | |
|---|---|---|
| EP | 1079251 A1 | 2/2001 |
| EP | 2000838 A1 | 12/2008 |
| JP | S60-57807 A | 4/1985 |
| JP | S62-129804 A | 6/1987 |
| JP | 2002-323641 A | 11/2002 |
| JP | 2004-151670 A | 5/2004 |
| WO | WO-99/64906 A1 | 12/1999 |
| WO | WO-2014/041450 A1 | 3/2014 |

* cited by examiner

CONNECTOR DEVICE, CONNECTOR AND CONNECTION CABLE

CROSS-REFERENCE TO RELATED APPLICATIONS

This application claims priority to German Patent Application No. DE 10 2021 111 848.4, filed May 6, 2021, the disclosure of which is incorporated by reference herein in its entirety.

BACKGROUND OF THE INVENTION

The invention relates to a connector system having a first connector device and a second connector device as claimed in Claim 1, a connector as claimed in Claim 21, a connector kit for putting together a connector device as claimed in Claim 23, and a method for putting together a connector device as claimed in Claim 24.

A fiber optic connector comprising a ferrule and a two-part outer housing is already known from US 2020/326488 A1.

A fiber optic connector system of male connector gender comprising a ferrule is already known from EP 0 964 277 A1. The ferrule is pressed into a ferrule holder together with a hollow fiber holder.

A fiber optic connector including a ferrule, a ferrule holder and a tubular housing is already known from EP 1 079 251 A1.

Fiber optic plug contacts of male connector gender are already known from EP 2 000 838 A1 and WO 2014/041450 A1. The object of the invention is in particular to provide a connector device of this generic type with improved properties with regard to construction. The object is achieved according to the invention by the features of Claims 1, 21, 23 and 24, while advantageous embodiments and further developments of the invention are revealed by the subclaims.

Advantages of the Invention

A connector system is proposed having a first connector device including a first universal module and a first configuration module, and having a second connector device including a second universal module identical to the first universal module and a second configuration module, wherein the universal modules each include an optical contact and the configuration modules each define a connector gender, and wherein the first connector device and the second connector device are suitable for entering into a common plug connection when assembled.

Such an embodiment may in particular provide a connector system with improved properties with regard to construction. In particular, such an embodiment allows particularly advantageous properties to be achieved with regard to a form factor. In particular, such an embodiment can provide a first connector device and a second connector device with an advantageously particularly slim form factor. In particular, an advantageously slim universal connector can be provided, which can be configured to be both male and female. Furthermore, prefabrication can be performed particularly simply, quickly and, in particular, particularly reliably using the connector devices. Furthermore, reliability and/or service life can in particular be improved, since the connector devices are designed in particular to be reusable.

The first connector device and/or the second connector device could be configured at least as a part, in particular as a submodule, of a connector. In particular, the first connector device and/or the second connector device could also comprise the entire connector. The connector could, for example, be configured as an electrical connector. The connector is preferably configured as an optical connector. The connector could also conceivably be configured as a hybrid connector, which is intended to produce both at least one electrical plug connection and at least one optical plug connection. The first connector device and/or the second connector device could, for example, be configured as an electrical connector device. The first connector device and/or the second connector device is preferably configured as an optical connector device. The first connector device and/or the second connector device could likewise conceivably be configured as a hybrid connector device. In particular, the first connector device and the second connector device could be part of a common connector, which could for example be configured, without being limited thereto, as a ruggedized connector. The first connector device and the second connector device could also each be part of a separate connector and, for example, be pluggable together. An assembled state corresponds in particular to a prefabricated, in particular operational, state, specifically in particular in connection with a cable.

The first universal module of the first connector device and the second universal module of the second connector device are of mutually identical configuration, wherein the first universal module could differ from the second universal module for example with regard to manufacturing tolerances or the like.

When assembled, the first configuration module and the second configuration module each define a connector gender for the first connector device and the second connector device. The first configuration module and the second configuration module could each, when assembled, conceivably define a different connector gender for the first connector device and the second connector device. The first configuration module and the second configuration module could each, when assembled, also conceivably define an identical connector gender for the first connector device and the second connector device.

Regardless of a connector gender defined by the first configuration module and the second configuration module when assembled, the first connector device and the second connector device include the mutually identically configured universal modules.

When assembled, the first connector device and the second connector device are intended to enter into a common plug connection, wherein the first connector device and the second connector device could be connected together, for example. The first connector device and the second connector device could conceivably jointly be part of a connector and, in the assembled state, be intended to jointly enter into a plug connection with a further connector. It would additionally be conceivable for the first connector device and the second connector device to be part of separate connectors and, in the assembled state, to be intended to enter into a plug connection with one another, in which the first connector device and the second connector device are plugged together, in particular plugged into one another.

The universal modules each include an optical contact, which is configured in particular as a ferrule. The optical contact could conceivably alternatively or additionally be configured as a lens and/or as a lens contact. The universal modules could for example comprise at least one component which holds the optical contact when assembled.

"Intended" should be understood to mean specially designed and/or equipped. Where an item is intended for a specific function, this should be understood to mean that the item fulfills and/or performs this specific function in at least one application state and/or operating state.

It is further proposed that the first connector device and the second connector device have, at least in places, mutually identical external geometries when assembled. In particular, when assembled the first connector device and the second connector device include, in each case viewed in the plug-in direction, at least one sub-region with mutually identical external geometries, wherein mutually identical external geometries may differ, for example with regard to manufacturing tolerances or the like. The first connector device and the second connector device in particular have, at least in places, an identical form factor when assembled. Such an embodiment may in particular result in particularly advantageous properties with regard to construction. In particular, it may provide particularly good compatibility. Furthermore, the number of parts can advantageously be kept low, especially with regard to connector receptacles, whereby cost efficiency may moreover in particular be increased.

It is additionally proposed that the first configuration module and the second configuration module have, at least in places, mutually identical external geometries when assembled. In particular, when assembled the first configuration module and the second configuration module include, in each case viewed in the plug-in direction, at least one sub-region with mutually identical external geometries, wherein mutually identical external geometries may differ, for example with regard to manufacturing tolerances or the like. The first configuration module and the second configuration module in particular have, at least in places, an identical form factor when assembled. Such an embodiment may in particular result in particularly advantageous properties with regard to construction. In particular, it may provide particularly good compatibility. Furthermore, the number of parts can advantageously be kept low, especially with regard to connector receptacles, whereby cost efficiency may moreover in particular be increased.

It is further proposed that the connector system include a receiving element including a first receptacle for the first connector device and a second receptacle for the second connector device. In particular, when assembled the first connector device and the second connector device are respectively received in the first receptacle and in the second receptacle of the receiving element. In particular, when assembled the receptacle at least partly and preferably completely encloses the first connector device and the second connector device in the circumferential direction. The receiving element is configured in particular as an overhousing surrounding the connector devices. The receiving element could in particular, without being limited thereto, be formed as an outer housing that is at least substantially protected from environmental influences. The receiving element could be at least partly and preferably completely sealed against environmental influences. In particular, the receiving element could be protected, in particular sealed, against the ingress of water, for example splash water and/or rainwater or the like, and/or advantageously protected against the ingress of dust. The receiving element could conceivably comprise sealing elements for sealing against environmental influences. When assembled, the receiving element could for example be protected, in particular sealed, with an IP67 rating, advantageously with an IP68 rating. In particular, the connector system, in particular at least the first connector device and/or at least the second connector device, is suitable for in particular permanent outdoor use. In this context, "at least substantially" should be understood to mean that any deviation from a specified value is in particular less than 25%, preferably less than 10% and particularly preferably less than 5% of said specified value. In particular, such an embodiment can improve construction. Such an embodiment can further provide, in particular, broad application possibilities for the connector system.

It is furthermore proposed that the first receptacle and the second receptacle be of mutually identical configuration. In particular, the first receptacle and the second receptacle are of at least substantially mutually identical configuration. It would also be conceivable for the first receptacle and the second receptacle to be configured in one piece, specifically in particular in the case where the first connector device and the second connector device are plugged together, in particular plugged into one another, in order to enter into the common plug connection. "One-piece" should be understood as at least materially bonded, for example by a welding process, an adhesive bonding process, an injection molding-on process and/or any other process that appears reasonable to a skilled person, and/or advantageously formed in one piece, such as for example by production from a casting and/or by production using a single- or multi-component injection molding method and advantageously from a single blank. Such an embodiment can in particular increase compatibility and/or advantageously reduce component diversity.

It is additionally proposed that the configuration modules each include at least one fixing element for fixing the respective connector device to the receiving element, in particular in the first and/or second receptacle. The fixing element is intended in particular for connecting the respective connector device to the receiving element. When assembled, the fixing element at least connects the respective connector device to the receiving element. At least one first element being "connected" to at least one further element should be understood to mean that the first element is advantageously connected to the further element via at least one frictional connection and/or at least one form-fit connection, for example via a riveted and/or latching connection and/or a tongue-and-groove connection and/or a clamping connection and/or a further connection which appears reasonable to a skilled person. The fixing element could conceivably be configured as a clamping ring for fixing the respective connector device to the receiving element. The fixing element preferably includes at least one latching means, advantageously a plurality of latching means and preferably exactly three latching means, for fixing the respective connector device to the receiving element. In this context, a "latching means" should be understood to mean a resilient means for producing a latching connection, which is intended to be elastically deflected during assembly. Such an embodiment makes it possible in particular to achieve a particularly advantageous construction, specifically in particular with regard to fixing the connector device in an overhousing.

It is further proposed that the configuration modules each include at least one configuration element and the universal module at least one housing element formed separately from the configuration element, wherein the configuration element and the housing element, when assembled, are arranged one behind the other, in particular adjoining one another, when viewed in the plug-in direction. This in particular allows advantageous properties to be achieved with regard to assembly. The plug-in direction is in particular an axial direction of the connector devices. The axial direction corresponds in particular to a main extension direction of the respective connector device, wherein the latter runs parallel to a longest edge of the smallest geometric cuboid which still fully encloses the connector device.

It is further proposed that the configuration element have a first receiving region for the housing element. When assembled, the housing element is in particular at least partly received in the first receiving region. In particular, when assembled at least one sub-region of the housing element is at least partly received in the first receiving region. The first receiving region could in particular be configured as a recess and/or a depression or the like. The first receiving region is preferably formed as a sub-region, arranged in the circumferential direction of the configuration element, which has a smaller diameter than regions of the configuration element adjoining the sub-region. Such an embodiment may in particular result in advantageous properties with regard to assembly.

It is further proposed that the housing element have at least one second receiving region, in particular two second receiving regions, for the configuration element. When assembled, the configuration element is in particular at least partly received in the second receiving region. In particular, when assembled at least one sub-region of the configuration element is at least partly received in the second receiving region. The second receiving region could in particular be configured as a recess and/or a depression or the like. Such an embodiment may in particular result in advantageous properties with regard to assembly.

It is further proposed that the configuration element and the housing element be arranged overlapping in at least one sub-region, in particular in the receiving region, when assembled. The configuration element and the housing element are preferably arranged to overlap, at least in the region of the first receiving region, when assembled. This allows advantageously stable fixing of the configuration element with the housing element.

It is further proposed that the configuration element of the first configuration module at least partly surround the first universal module and the configuration element of the second configuration module at least partly surround the second universal module when assembled. In particular, the configuration element of the first configuration module, in particular together with the housing element, forms an inner housing, in particular for the first universal module. In particular, the configuration element of the second configuration module, in particular together with the housing element, forms an inner housing, in particular for the second universal module. This may in particular further improve properties with regard to construction. It is in particular conceivable that a pre-assembled module be provided in this manner.

It is additionally proposed that the configuration modules be embodied to be interchangeable in order to change connector gender. The configuration modules are preferably embodied to be interchangeable even when already assembled in order to change connector gender. This in particular allows connector gender to be changed subsequently in the assembled state. This may in particular further increase compatibility and/or flexibility.

It is further proposed that the first configuration module and the second configuration module have different longitudinal extents. The longitudinal extent of the first configuration module and the longitudinal extent of the second configuration module, specifically with regard to a length in the axial direction of the connector devices, could for example conceivably differ from one another by at least 5%, advantageously by at least 10% and preferably by at least 15%. In particular, that configuration module which, when assembled, defines a female connector gender has a longitudinal extent that is longer by at least 5%, advantageously by at least 10% and preferably by at least 15%, than that configuration module which, when assembled, defines a male connector gender.

It is further proposed that the first configuration module comprise at least one coupling element for receiving at least one of the optical contacts and, in particular, the optical contacts, which is assemblable at least perpendicular to the plug-in direction via an assembly opening in the configuration module. In particular, the configuration element of the first configuration module includes the assembly opening. The coupling element preferably encloses the optical contact of the second connector device in a common plug connection with the second connector device. The coupling element could, in particular, be configured as a coupling sleeve which, for example, could be open when viewed in the axial direction. The coupling element is arranged in particular inside the configuration module in the assembled state. In particular, the coupling element is part of that configuration module which is intended to define a female connector gender of the connector device. This can further increase the compatibility and/or flexibility of the connector system.

It is additionally proposed that the first configuration module comprise at least one cover element which, when assembled, closes the assembly opening. The cover element could when assembled conceivably be latched together with the configuration element of the first configuration module. In particular, the cover element is press-fittable into the assembly opening for fixing with the configuration element of the first configuration module. The cover element could moreover conceivably rest against the coupling element inside the configuration module, in particular inside the configuration element. This may improve construction, in particular in terms of durability and/or stability.

It is further proposed that the cover element be assemblable at least perpendicular to the plug-in direction. This may in particular greatly simplify assembly. Fixing of the cover element to the configuration element may in particular be simplified.

It is further proposed that the cover element outwardly bound the first configuration module in at least one sub-region. In particular, the cover element outwardly bounds the first configuration module at least in a sub-region in flush manner with regard to an outer face of the first configuration module. In particular, the cover element outwardly bounds the configuration element at least in a sub-region in flush manner with regard to an outer face of the configuration element. In this way, particularly advantageous properties may in particular be achieved with regard to stability. In addition, an advantageously compact form factor of the first configuration module, in particular of the first connector device, may in particular be provided.

It is moreover proposed that the first configuration module comprise a clamping ring for fixing the cover element, in particular to the configuration element. This may further improve stability.

The fixing element of the first configuration module and the clamping ring could for example be configured separately from one another. If the fixing element of the first configuration module and the clamping ring are configured in one piece with one another, construction may be further improved, in particular in terms of a compact form factor.

It is further proposed that the connector devices each comprise a plurality of independent strain relief units. The connector devices preferably each include at least three independent strain relief units for an optical cable. The connector devices, specifically in particular the universal modules, could for example each include a C spring which is intended in the assembled, in particular prefabricated, state with a cable, in particular to clamp an optical fiber of the cable. Alternatively or in addition, the connector devices, specifically in particular the universal modules, could include at least one clamping block which, in the assembled, in particular prefabricated, state with a cable, is intended to clamp at least one coated fiber of the cable. Alternatively or in addition, the connector devices, specifically in particular the universal modules, could include at least one crimping sleeve which, in the assembled, in particular prefabricated, state with a cable, is intended to clamp at least one sheath of the cable. Such an embodiment may in particular result in improved properties with regard to stability.

In addition, a connector having the first connector device of the connector system is proposed. The connector includes just one of the connector devices, in particular the first connector device, of the connector system. This in particular allows an individual connector to be provided with a single connector device.

It is additionally proposed that the connector include the second connector device. This in particular allows an individual connector to be provided with two of the connector devices.

A connector kit for putting together a connector device is also proposed, having at least one universal module including an optical contact, having at least one first configuration module, and having at least one second configuration module, wherein the connector device is configurable female by the universal module in combination with the first configuration module and configurable male by the universal module in combination with the second configuration module. The connector device could be configured at least as a part, in particular as a submodule, of a connector. The connector device could in particular also comprising the entire connector. The connector could, for example, be configured as an electrical connector. The connector is preferably configured as an optical connector. The connector could also conceivably be configured as a hybrid connector, which is intended to produce both at least one electrical plug connection and at least one optical plug connection. The connector device could, for example, be configured as an electrical connector device. The connector device is preferably configured as an optical connector device. The connector device could also conceivably be configured as a hybrid connector device. In particular, the connector device could be part of a common connector, which could for example be configured, without being limited thereto, as a ruggedized connector. The connector devices could also each be part of a separate connector and pluggable together, for example. An assembled state corresponds in particular to a prefabricated, in particular operational, state, specifically in particular in connection with a cable. The first universal module of the first connector device and the second universal module of the second connector device are of mutually identical configuration, wherein the first universal module could differ from the second universal module for example with regard to manufacturing tolerances or the like. Regardless of the connector gender defined by the first configuration module and the second configuration module when assembled, the connector device includes the universal module. The universal module includes an optical contact, which is configured in particular as a ferrule. The optical contact could conceivably alternatively or additionally be configured as a lens and/or as a lens contact. The universal module could for example comprise at least one component which holds the optical contact when assembled. "Intended" should be understood to mean specially designed and/or equipped. Where an item is intended for a specific function, this should be understood to mean that the item fulfills and/or performs this specific function in at least one application state and/or operating state. In particular, improved properties with regard to flexibility may be achieved with a connector kit configured in this way.

A method for putting together a connector device, in particular the connector system is additionally proposed, in particular using a connector kit, having at least one universal module including an optical contact, having at least one first configuration module, and having at least one second configuration module, wherein the connector device is alternatively configured female by the universal module in combination with the first configuration module or configured male by the universal module in combination with the second configuration module.

DRAWINGS

Further advantages are revealed by the following description of the drawings. The drawings show an exemplary embodiment of the invention. The drawings, description and claims contain numerous features in combination. A person skilled in the art will expediently also consider the features individually and combine them into meaningful further combinations.

In the figures.

DESCRIPTION OF THE EXEMPLARY EMBODIMENT

The figures, in particular FIGS. 1 to 4, show a connector system 10. The connector system 10 includes a first connector device 12, which is shown assembled and in perspective view in FIG. 1 and in an exploded view in FIG. 2. The first connector device 12 includes a first universal module 16 and a first configuration module 20.

Figure 3:
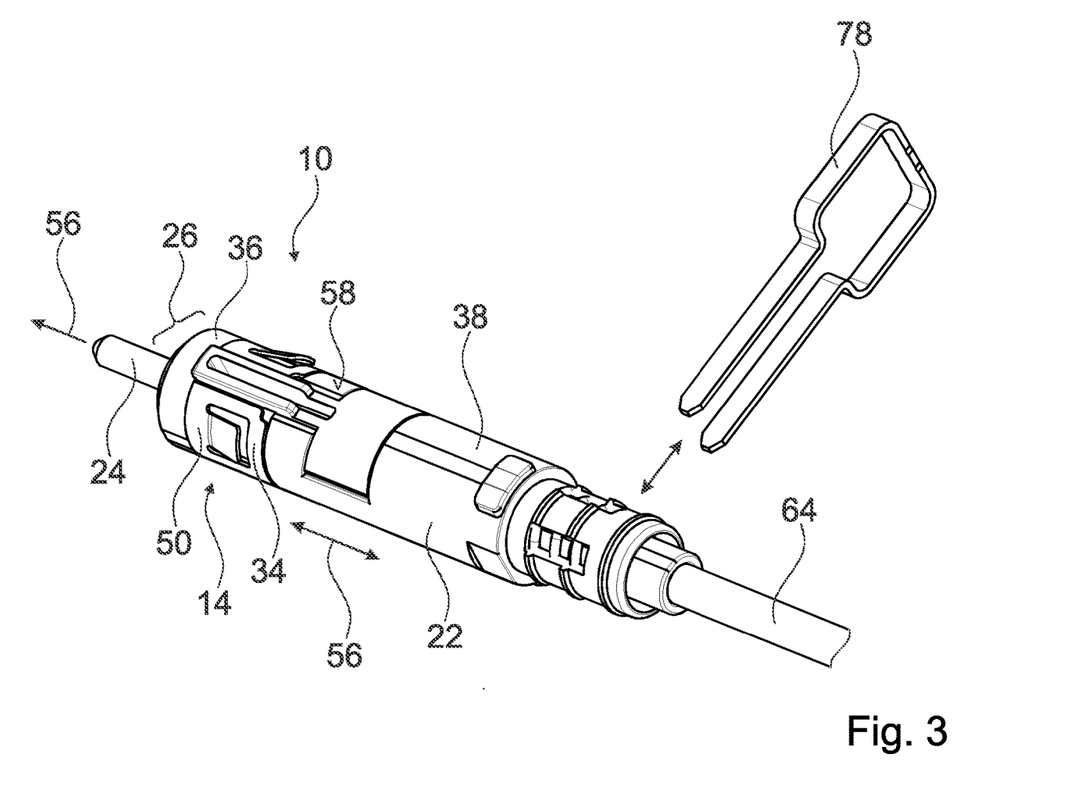
FIG. 3 shows a second connector device of the connector system in an assembled state with a cable.
Figure 4:
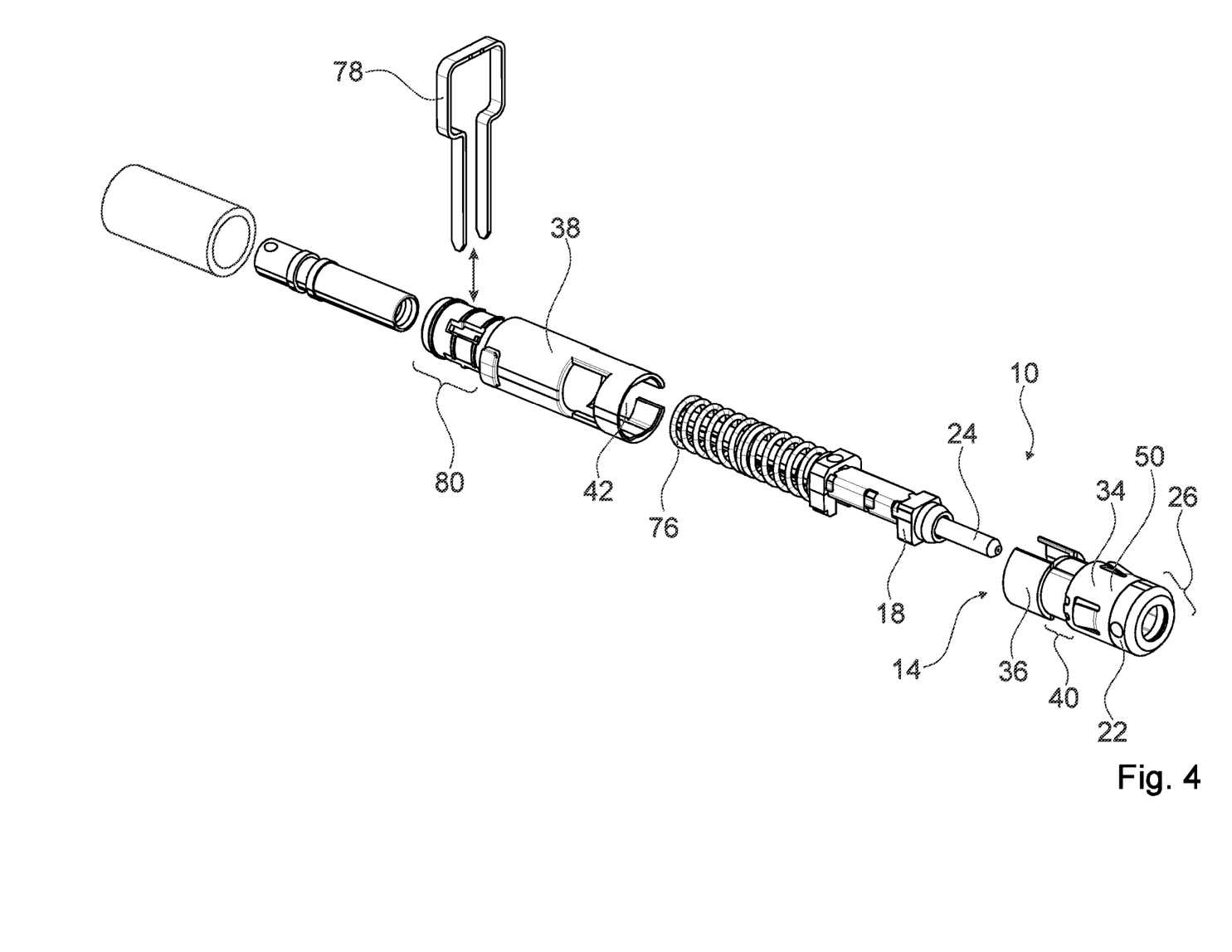
FIG. 4 is a simplified exploded representation of the second connector device with a second universal module and with a second configuration module.

The connector system 10 includes moreover a second connector device 14, which is shown assembled and in perspective view in FIG. 3 and in an exploded view in FIG. 4. The second connector device 14 includes a second universal module 18 identical to the first universal module 16. In addition, the second connector device 14 includes a second configuration module 22.

The universal modules 16, 18 each include one optical contact 24. In the example shown, the optical contacts 24 of the universal modules 16, 18 are configured as optical ferrules.

The configuration modules 20, 22 each define a connector gender for the connector devices 12, 14. In the example shown, the first configuration module 20 defines a female connector gender for the first connector device 12 (see FIG. 2).

In the example shown, the second configuration module 22 defines a male connector gender for the second connector device 14 (see FIG. 4).

When assembled, the first connector device 12 and the second connector device 14 have, at least in places, mutually identical external geometries 26. In the example shown, the first connector device 12 and the second connector device 14 have, when assembled, mutually identical external geometries 26 in a front end region of the connector devices 12, 14 when viewed in the plug-in direction.

Specifically, when assembled, the first configuration module 20 and the second configuration module 22 have, at least in places, mutually identical external geometries 26. Specifically, in the example shown, the first configuration module 20 and the second configuration module 22 have, when assembled, mutually identical external geometries 26 in a front end region of the configuration modules 20, 22 when viewed in the plug-in direction.

The first connector device 12 and the second connector device 14 are suitable for being plugged into an identical socket due to their external geometries 26 which are mutually identical in places.

Figure 5:
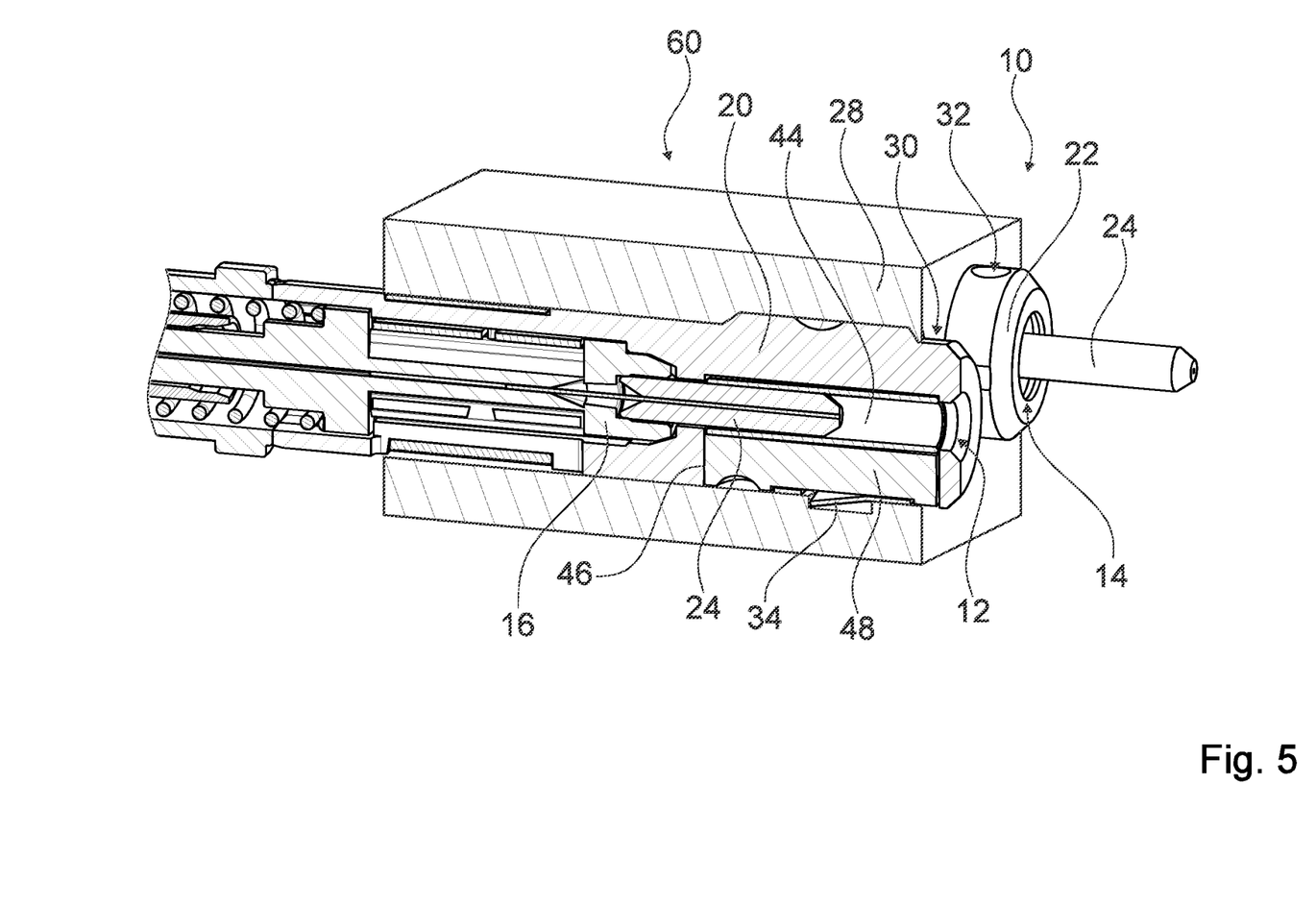
FIG. 5 shows a receiving element of the connector system with a first receptacle and with a second receptacle.

The connector system 10 also includes a receiving element 28. The receiving element 28 includes a first receptacle 30 for the first connector device 12. In addition, the receiving element 28 includes a second receptacle 32 for the second connector device 14.

The first receptacle 30 and the second receptacle 32 are of mutually identical configuration. The first connector device 12 and the second connector device 14 are suitable for being plugged into the mutually identically configured receptacles 30, 32 due to their external geometries 26 which are mutually identical in places.

The configuration modules 20, 22 each include at least one fixing element 34 for fixing the respective connector device 12, 14 to the receiving element 28. The fixing elements 34 are intended to fix the respective connector device 12, 14 to the first receptacle 30 and/or the second receptacle 32.

The configuration modules 20, 22 each include a configuration element 36. The universal modules 16, 18 each include a housing element 38 formed separately from the configuration element 36. The housing element 38 of the first universal module 16 is configured identically to the housing element 38 of the second universal module 18.

When assembled, the configuration element 36 of the first configuration module 20 surrounds the first universal module 16 in a front sub-region thereof, when viewed in the plug-in direction. Likewise, when assembled, the configuration element 36 of the second configuration module 22 surrounds the second universal module 18 in a front sub-region thereof, when viewed in the plug-in direction. When assembled, the configuration element 36 at least partly forms an inner housing for the universal modules 16, 18.

Figure 1:
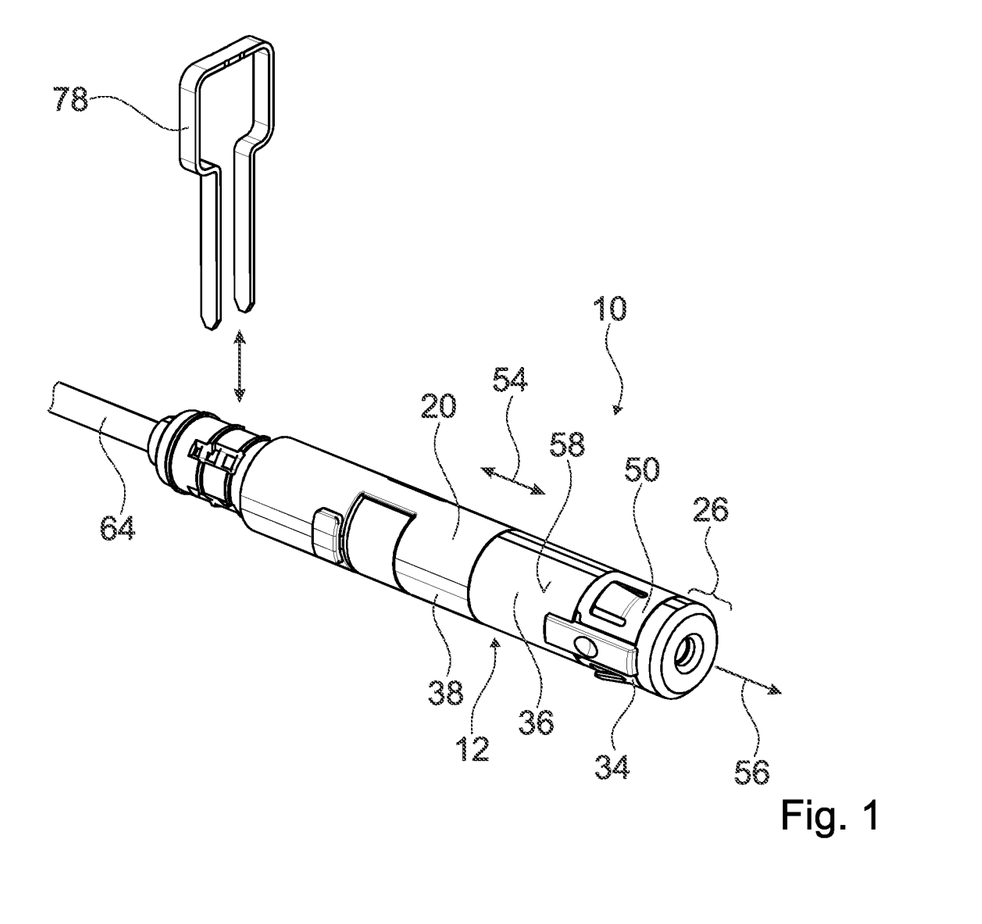
FIG. 1 shows a connector system having a first connector device in an assembled state with a cable.

When assembled, the configuration element 36 and the housing element 38 are arranged one behind the other when viewed in the plug-in direction (see FIGS. 1 and 3). When assembled, the configuration element 36 and the housing element 38 are arranged adjacent to one another when viewed in the plug-in direction.

Figure 2:
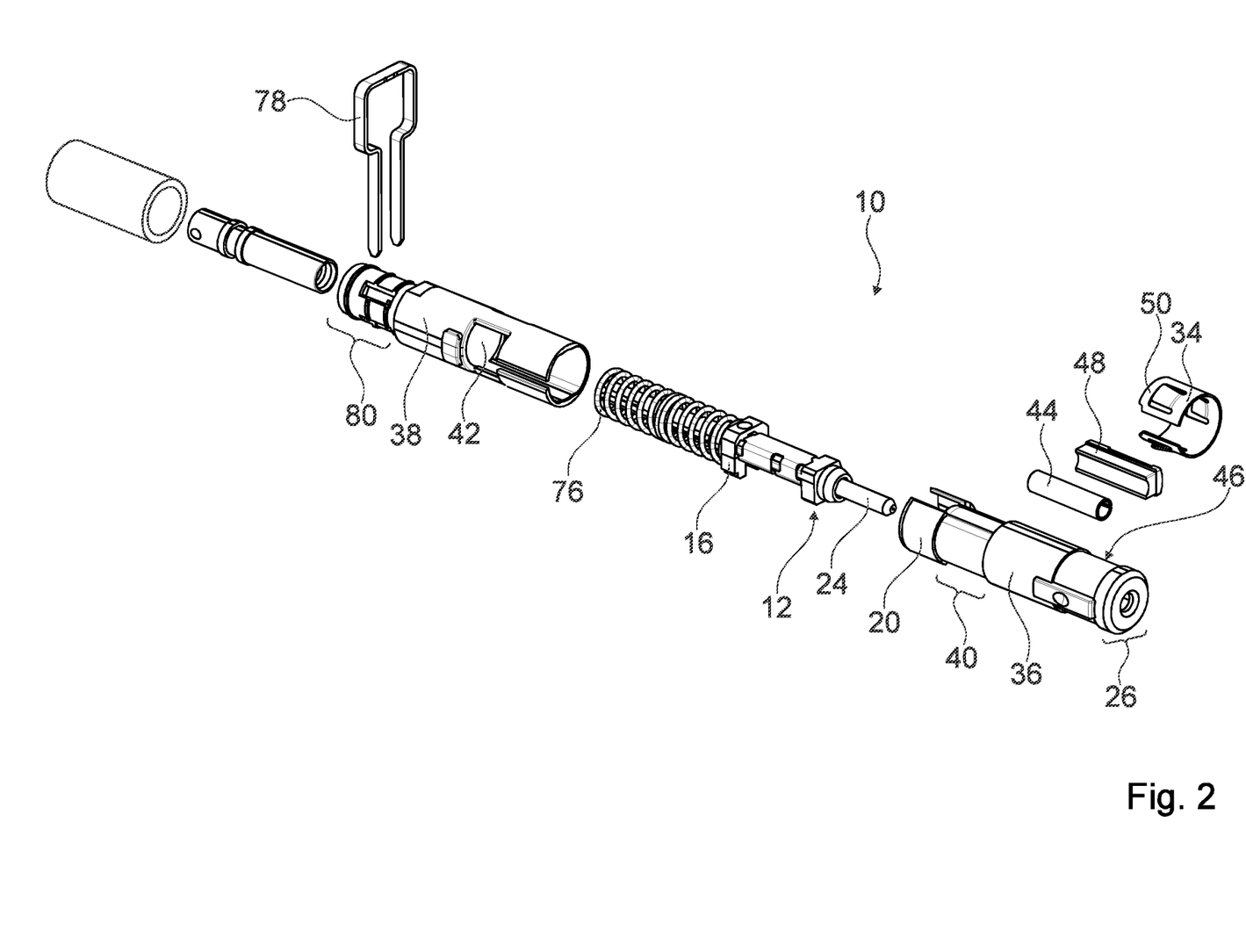
FIG. 2 is a simplified exploded representation of the first connector device with a first universal module and with a first configuration module.

The configuration element 36 includes a first receiving region 40 for the housing element 38 (see also FIGS. 2 and 4). In addition, the housing element 38 includes a second receiving region 42 for the configuration element 36.

The configuration element 36 and the housing element 38 are arranged overlapping in at least one sub-region when assembled (see FIGS. 1 and 3). In the example shown, the configuration element 36 and the housing element 38 are arranged overlapping with regard to the first receiving region 40, when assembled.

The configuration modules 20, 22 are embodied to be interchangeable in order to change connector gender. Specifically, the configuration modules 20, 22 are configured to be interchangeable when assembled in order to change connector gender.

The first configuration module 20 and the second configuration module 22 have different longitudinal extents 54. Specifically, the first configuration module 20, which when assembled defines a female connector gender for the first connector device 12, has a greater longitudinal extent 54.

Specifically, at least the configuration element 36 of the first configuration module 20 has a greater longitudinal extent 54. The configuration element 36 of the first configuration module 20 encloses the optical contact of the first connector device 12 when assembled. Specifically, when assembled, the optical contact of the first connector device 12 is arranged inside the configuration element 36 of the first configuration module 20.

The first configuration module 20 comprises at least one coupling element 44 for receiving at least one of the optical contacts 24. The first configuration module 20 comprises at least one coupling element 44 for receiving the optical contacts 24. When assembled, the coupling element 44 is integrated into the female configured connector device 12.

The coupling element 44 is assemblable at least perpendicular to a plug-in direction 56. Specifically, the coupling element 44 is assemblable via an assembly opening 46 in the first configuration module 20 (see FIG. 2).

The first configuration module 20 comprises a cover element 48. The cover element 48 closes the assembly opening 46 when assembled.

The cover element 48 is assemblable at least perpendicular to the plug-in direction 56. Specifically, the cover element 48 is press-fittable into the assembly opening 46 perpendicular to the plug-in direction 56. When assembled, the cover element 48 is press-fitted into the assembly opening 46 perpendicular to the plug-in direction 56.

The cover element 48 outwardly bounds the first configuration module 20 in the region of the assembly opening 46. Specifically, the cover element 48 outwardly bounds the first configuration module 20 flush with the assembly opening 46. Specifically, the cover element 48 outwardly bounds the configuration element 36 in flush manner in the region of the assembly opening 46 relative to an outer face 58 of the configuration element 36.

The first configuration module 20 includes a clamping ring 50. The clamping ring 50 is intended for fixing the cover element 48. Specifically, the clamping ring 50 is intended for fixing the cover element 48 to the configuration element 36.

In the example shown, the fixing element 34 of the first configuration module 20 and the clamping ring 50 are formed in one piece with one another.

Figure 6:
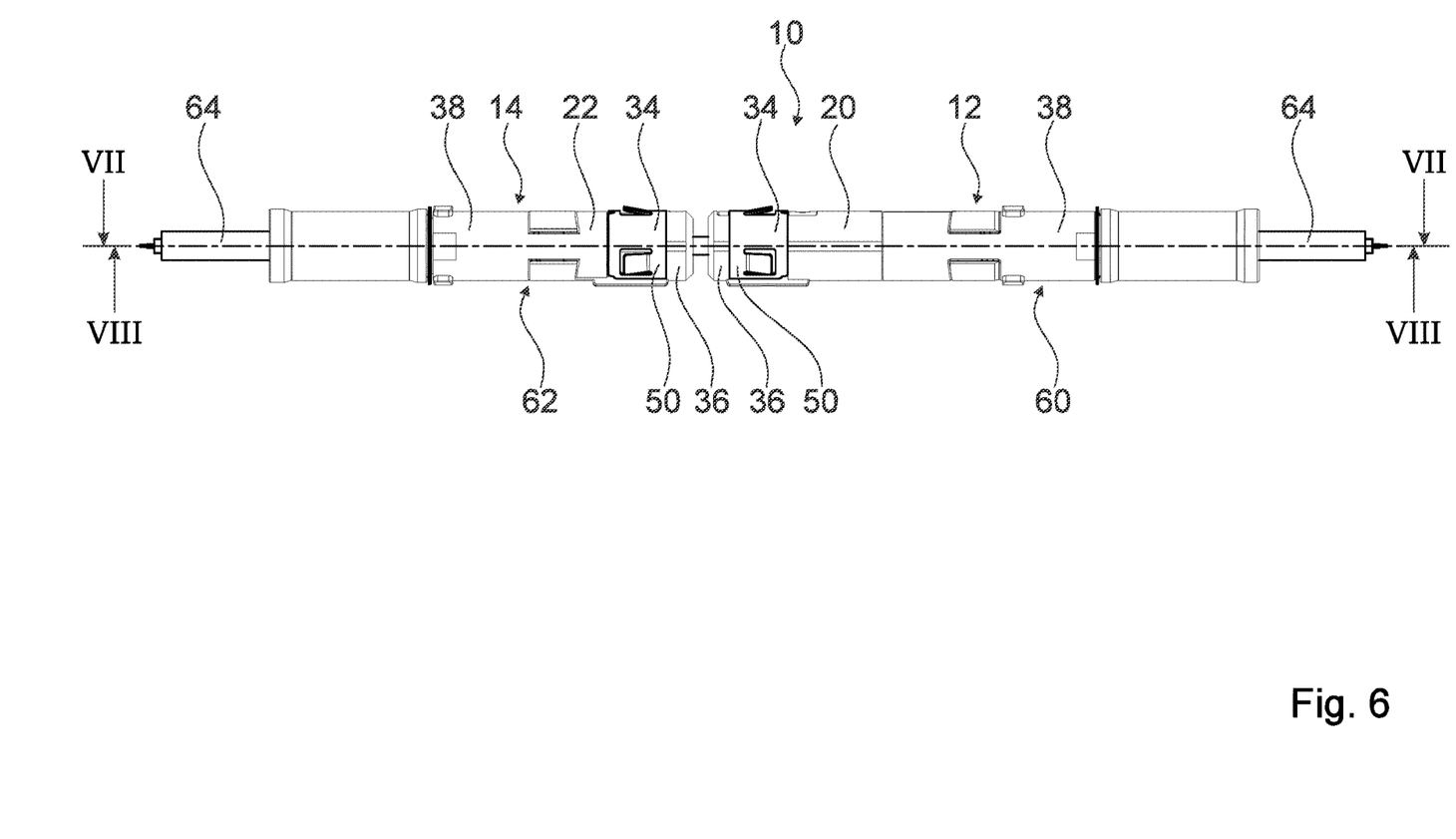
FIG. 6 is a schematically simplified representation of the first connector device and the second connector device and a coupling element of the first configuration module.

The first connector device 12 and the second connector device 14 are suitable for entering into a common plug connection when assembled (see also FIGS. 5 and 6).

FIG. 5 shows an exemplary common plug connection of the first connector device 12 and the second connector device 14, wherein both connector devices 12, 14 are received in the receiving element 28, which is shown schematically and is configured as an overhousing.

FIG. 5 thus schematically illustrates a connector 60 having the first connector device 12 and having the second connector device 14 of the connector system 10.

Figure 7:
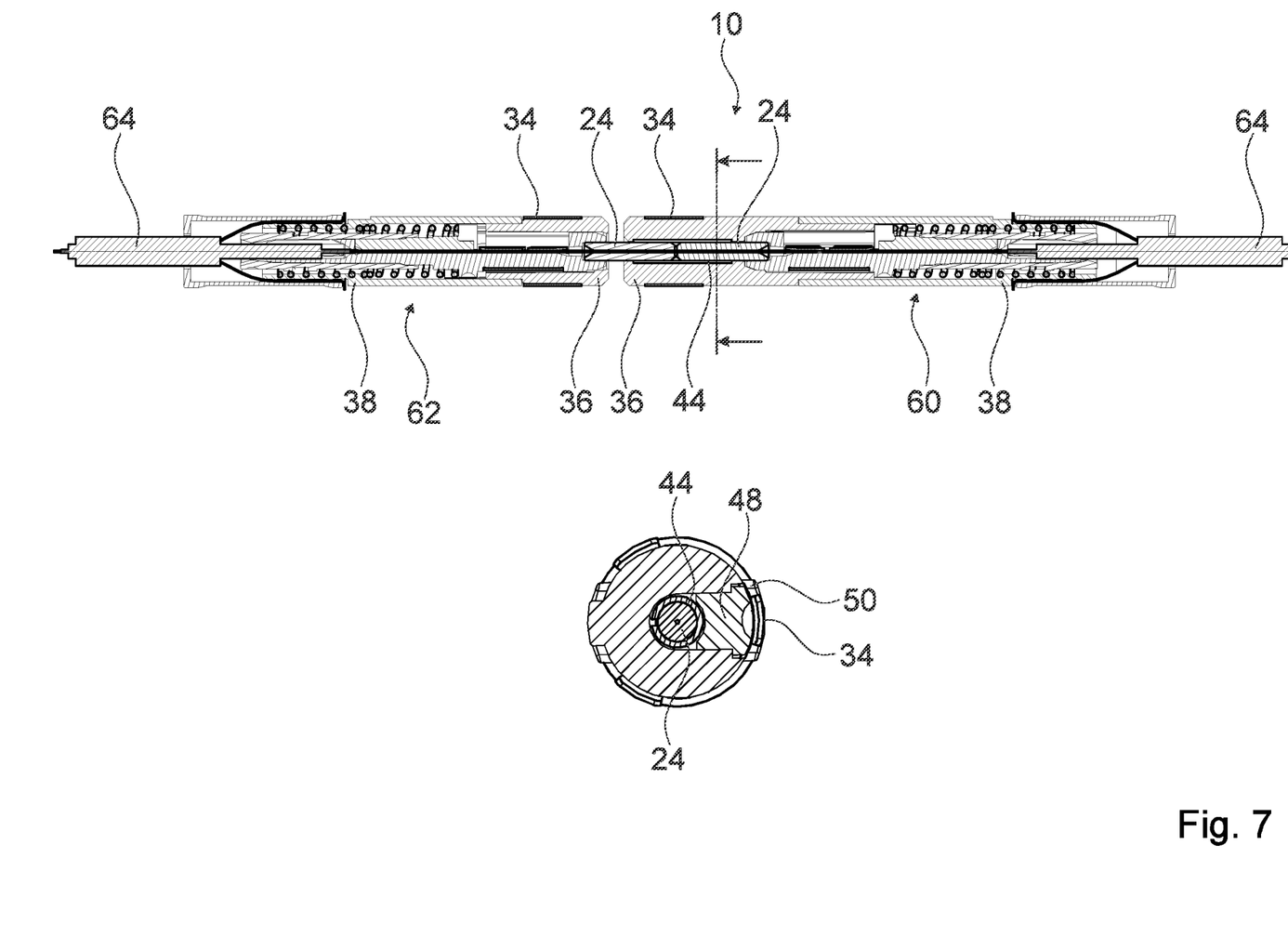
FIG. 7 shows sectional representations of the first connector device and the second connector device and the coupling element of the first configuration module.

FIG. 6 shows another exemplary common plug connection of the first connector device 12 and the second connector device 14, wherein the two connector devices 12, 14 form a common plug connection in which the first connector device 12 and the second connector device 14 are plugged into one another. FIG. 7 shows the common plug connection of the first connector device 12 and the second connector device 14, each in sectional representation, specifically on the one hand along a longitudinal direction of the first connector device 12 and the second connector device 14 and on the other hand in a sectional view of a cross-section through the first connector device 12 made in the region of the optical contact 24 of the first universal module of the first connector device 12.

FIG. 6 thus schematically illustrates a connector 60 with just the first connector device 12 and a further connector 62 formed separately from the connector 60 with just the second connector device 14 of the connector system 10. In the example shown here, the first connector device 12 is configured female and the second connector device 14 is configured male.

Figure 8:
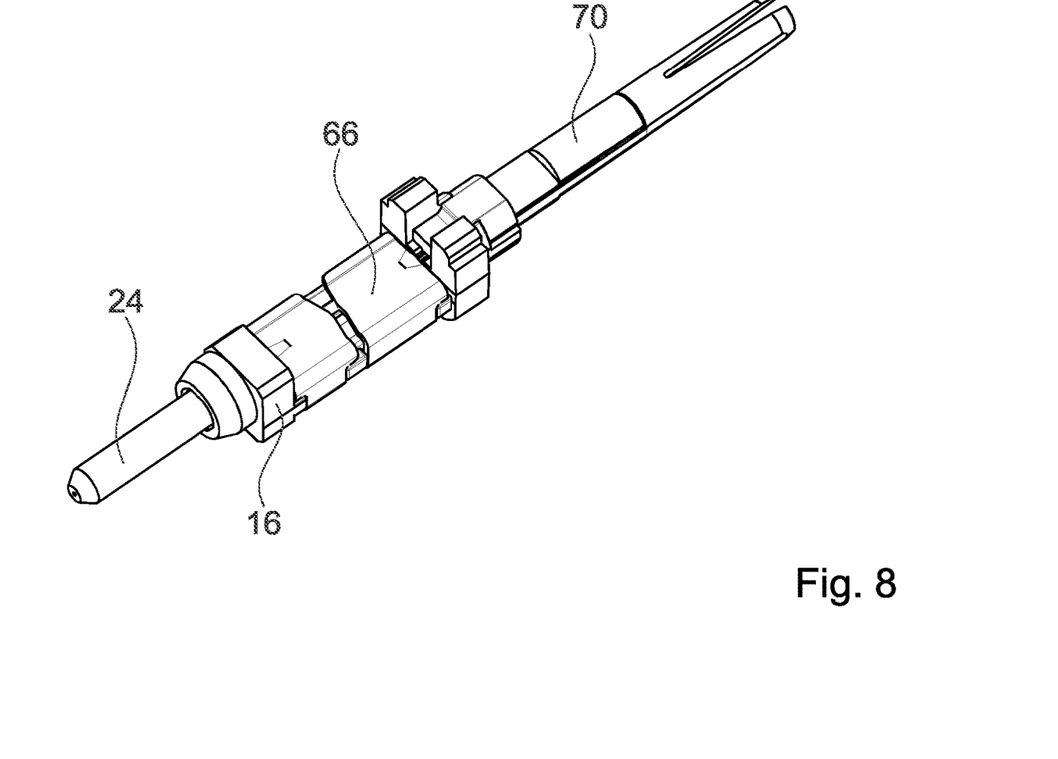
FIG. 8 shows by way of example a simplified perspective view of a part of the first universal module and FIG. 9 shows by way of example a simplified sectional view of the part of the first connector device with a plurality of independent strain relief units.
Figure 9:
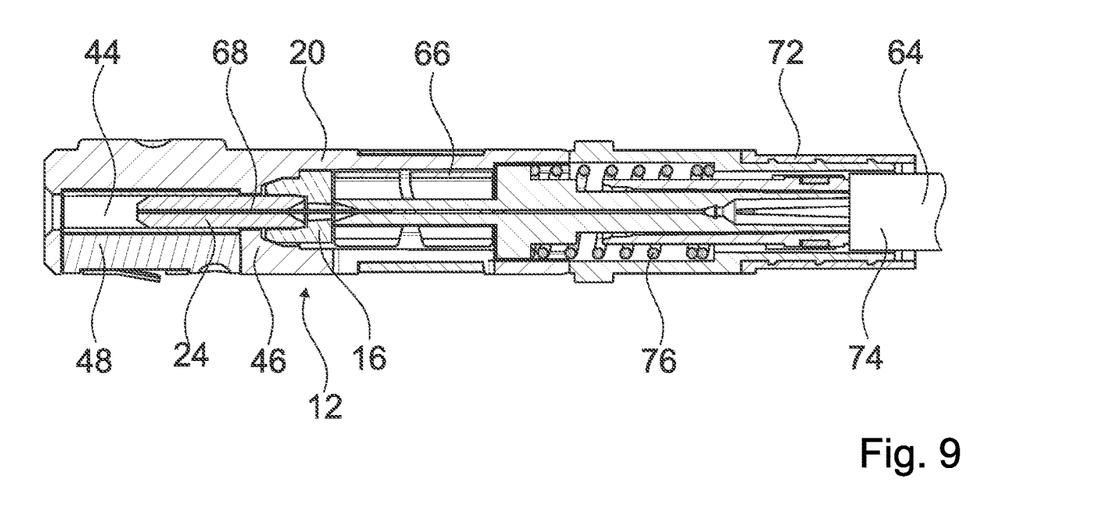

The connector devices 12, 14 also each comprise a plurality of independent strain relief units (see FIGS. 8 and 9).

Specifically, the connector devices 12, 14 each include a C spring 66 which is intended in the assembled, in particular prefabricated, state with a cable 64, to clamp an optical fiber 68 of the cable 64.

In addition, the connector devices 12, 14 each include a clamping block 70 which, in the assembled state, in particular in the prefabricated state with the cable 64, is intended to clamp at least one coated fiber (not shown) of the cable 64.

In addition, the connector devices 12, 14 each include a crimping sleeve 72 which, in the assembled state, in particular in the prefabricated state with the cable 64, is intended to clamp at least one sheath 74 of the cable 64.

The universal module 16, 18 including the optical contact 24, the first configuration module 20, and at least the second configuration module 22 further form a connector kit for putting together a connector device 12, 14, wherein the connector device 12, 14 is configurable female by the universal module 16, 18 in combination with the first configuration module 20 and configurable male by the universal module 16, 18 in combination with the second configuration module 22.

A method for putting together a connector device 12, 14 having at least one of the general purpose modules 16, 18 including the optical contact 24 will also be described at this point with reference to FIGS. 1 to 4.

The connector device 12, 14 is alternatively configured female by the universal module 16, 18 in combination with the first configuration module 20 or male by the universal module 16, 18 in combination with the second configuration module 22.

The assembly process is described below in simplified terms for an instance in which the connector device 12 is configured female by the universal module 16, 18 in combination with the first configuration module 20 (see FIG. 2).

The first universal module 16 is provided in a first method step.

Then, the coupling element 44 is inserted into the assembly opening 46 in the configuration element 36 of the first configuration module 20. The assembly opening 46 is closed using the cover element 48, specifically by press-fitting the cover element 48 into the assembly opening 46.

Then, the universal module 16 is inserted with a spring element 76 of the universal module 16 into the configuration element 36 of the first configuration module 20.

Then, the clamping block 70 is introduced into the first configuration module 20, in particular between the first configuration module 20 and the universal module 16.

The housing element 38 of the first universal module 16 is pushed on from behind, when viewed in the plug-in direction, such that the housing element 38 of the first universal module 16 latches together with the configuration element 36 of the first configuration module 20.

A securing element 78 of the first configuration module 20 is then inserted laterally into a rear end region 80 of the housing element 38 of the first universal module 16 to fix the first configuration module 20 and the universal module 16 in place.

The clamping ring 50 having the fixing element 34 is then pushed onto the configuration element 36 of the first configuration module 20.

The assembly process is described below in simplified terms for an instance in which the connector device 14 is configured male by the universal module 16, 18 in combination with the second configuration module 22 (see FIG. 4).

The second universal module 18 is provided in a first method step.

Then, the universal module 18 is inserted with a spring element 76 of the universal module 18 into the configuration element 36 of the second configuration module 22.

Then, the clamping block 70 is introduced into the second configuration module 22, in particular between the second configuration module 22 and the universal module 18.

The housing element 38 of the second universal module 18 is pushed on from behind, when viewed in the plug-in direction, such that the housing element 38 of the second universal module 18 latches together with the configuration element 36 of the first configuration module 22.

A securing element 78 of the second configuration module 22 is then inserted laterally into a rear end region 80 of the housing element 38 of the second universal module 18 to fix the second configuration module 22 and the universal module 18 in place.

The clamping ring 50 having the fixing element 34 is then pushed onto the configuration element 36 of the second configuration module 22.

REFERENCE SIGNS

10 Connector system
12 First connector device
14 Second connector device
16 First universal module 18 Second universal module
20 First configuration module
22 Second configuration module
24 Optical contact
26 External geometry
28 Receiving element
30 First receptacle
32 Second receptacle
34 Fixing element
36 Configuration element
38 Housing element
40 First receiving region
42 Second receiving region
44 Coupling element
46 Assembly opening
48 Cover element
50 Clamping ring
54 Longitudinal extent
56 Plug-in direction
58 Outer face
60 Connector
62 Further connector
64 Cable
66 C spring
68 Optical fiber
70 Clamping block
72 Crimping sleeve
74 Sheath
76 Spring element
78 Securing element
80 Rear end region

The invention claimed is:

1. A connector system having a first connector device including a first universal module and a first configuration module that can be combined with the initially separate first universal module and having a second connector device including a second universal module identical to the first universal module and a second configuration module that can be combined with the initially separate second universal module wherein the universal modules each include an optical contact and the configuration modules each define a connector gender, and wherein the first connector device and the second connector device are suitable for entering into a common plug connection when assembled.

2. The connector system as claimed in claim 1, wherein, when assembled, the first connector device and the second connector device have, at least in places, mutually identical external geometries.

3. The connector system as claimed in claim 1 wherein, when assembled, the first configuration module and the second configuration module have, at least in places, mutually identical external geometries.

4. The connector system as claimed in claim 1, wherein the connector system comprises a receiving element including a first receptacle for the first connector device and a second receptacle for the second connector device.

5. The connector system as claimed in claim 4, wherein the first receptacle and the second receptacle are of mutually identical configuration.

6. The connector system as claimed in claim 1, wherein the configuration modules each include at least one fixing element for fixing the respective connector device to the receiving element.

7. The connector system as claimed in claim 6, wherein the first configuration module comprises
at least one coupling element for receiving at least one of the optical contacts which is assemblable at least perpendicular to a plug-in direction via an assembly opening in the configuration module,
at least one cover element which, when assembled, closes the assembly opening, and
a clamping ring for fixing the cover element, and
wherein the fixing element of the first configuration module and the clamping ring are formed in one piece with one another.

8. The connector system as claimed in claim 1, wherein the first configuration module and the second configuration module each include at least one configuration element and the first universal module and the second universal module each include at least one housing element formed separately from the first configuration element, wherein the configuration element and the housing element, when assembled, are arranged one behind the other when viewed in the plug-in direction.

9. The connector system as claimed in claim 8, wherein the configuration element includes a first receiving region for the housing element.

10. The connector system as claimed in claim 8, wherein the housing element includes a second receiving region for the first configuration element.

11. The connector system as claimed in claim 8 wherein the configuration element and the housing element are arranged overlapping in at least one sub-region, in particular in the first receiving region, when assembled.

12. The connector system as claimed in claim 1, wherein the configuration element of the first configuration module at least partly surrounds the first universal module and the configuration element of the second configuration module at least partly surrounds the second universal module when assembled.

13. The connector system as claimed in claim 1, wherein the configuration modules are embodied to be interchangeable in order to change connector gender.

14. The connector system as claimed in claim 1, wherein the first configuration module and the second configuration module have different longitudinal extents.

15. The connector system as claimed in claim 1, wherein the first configuration module comprises at least one coupling element for receiving at least one of the optical contacts which is assemblable at least perpendicular to a plug-in direction via an assembly opening in the configuration module.

16. The connector system as claimed in claim 15, wherein the first configuration module comprises at least one cover element which, when assembled, closes the assembly opening.

17. The connector system as claimed in claim 16, wherein the cover element is assemblable at least perpendicular to the plug-in direction.

18. The connector system as claimed in claim 16, wherein the cover element outwardly bounds the first configuration module at least in a sub-region, in particular in flush manner.

19. The connector system as claimed in claim 16, wherein the first configuration module includes a clamping ring for fixing the cover element in particular to the first configuration element.

20. The connector system as claimed in claim 1, wherein the connector devices each comprise a plurality of independent strain relief units.

21. A connector comprising a first connector device of a connector system as claimed in claim 1.

22. The connector as claimed in claim 21, further comprising the second connector device.

\* \* \* \* \*